United States Patent
Abraham et al.

(10) Patent No.: US 9,277,567 B2
(45) Date of Patent: Mar. 1, 2016

(54) SYSTEMS AND METHODS FOR IMPROVED COMMUNICATION EFFICIENCY IN HIGH EFFICIENCY WIRELESS NETWORKS

(71) Applicant: QUALCOMM Incorporated, San Diego, CA (US)

(72) Inventors: Santosh Paul Abraham, San Diego, CA (US); Simone Merlin, Solana Beach, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 14/456,856

(22) Filed: Aug. 11, 2014

(65) Prior Publication Data

US 2015/0065155 A1 Mar. 5, 2015

Related U.S. Application Data

(60) Provisional application No. 61/871,785, filed on Aug. 29, 2013.

(51) Int. Cl.
*H04W 74/04* (2009.01)
*H04W 74/08* (2009.01)

(52) U.S. Cl.
CPC .......... *H04W 74/04* (2013.01); *H04W 74/0816* (2013.01)

(58) Field of Classification Search
CPC .............................. H04W 74/04; H04W 68/00
See application file for complete search history.

(56) References Cited

U.S. PATENT DOCUMENTS

| 2007/0160040 | A1 | 7/2007 | Kwon | |
| 2011/0310871 | A1* | 12/2011 | Fischer | H04W 74/002 370/338 |
| 2012/0044844 | A1* | 2/2012 | Trainin | H04L 12/413 370/310 |

FOREIGN PATENT DOCUMENTS

EP 2369894 A1 9/2011

OTHER PUBLICATIONS

Choi S., et al., "802 .11g CP: a solution for IEEE 802 .11g and 802 .11b inter-working", VTC 2003-Spring. The 57th. IEEE Semiannual Vehicular Technology Conference. Proceedings. Jeju, Korea, Apr. 22-25, 2003; [IEEE Vehicular Technolgy Conference], New York, NY : IEEE, US, vol. 1 , Apr. 22, 2003, pp. 690-694, XP010862203.
International Search Report and Written Opinion—PCT/US2014/050725—ISA/EPO—Nov. 20, 2014 (134302WO).

* cited by examiner

*Primary Examiner* — Curtis Odom
(74) *Attorney, Agent, or Firm* — Knobbe, Martens, Olson and Bear LLP

(57) ABSTRACT

Systems, methods, and devices for wireless communication are described herein. In some aspects, a method of wireless communication includes transmitting a first message for reserving a communication medium utilizing a first transmission characteristic such that the first message is decodable by at least a first subset of a plurality of wireless devices. The method may further include subsequently transmitting a second message for clearing a reservation of the communication medium utilizing a second transmission characteristic such that the second message is decodable by at least a second subset of the plurality of wireless devices and not the first subset of the plurality of wireless devices, thereby clearing access to at least one communication channel for the second subset of the plurality of wireless devices.

44 Claims, 6 Drawing Sheets

SYSTEMS AND METHODS FOR IMPROVED COMMUNICATION EFFICIENCY IN HIGH EFFICIENCY WIRELESS NETWORKS

CLAIM OF PRIORITY UNDER 35 U.S.C. §119

The present Application for Patent claims priority to Provisional Application No. 61/871,785 entitled "SYSTEMS AND METHODS FOR IMPROVED COMMUNICATION EFFICIENCY IN HIGH EFFICIENCY WIRELESS NETWORKS" filed Aug. 29, 2013, and assigned to the assignee hereof. Provisional Application No. 61/871,785 is hereby expressly incorporated by reference herein.

BACKGROUND

1. Field

The present application relates generally to wireless communications, and more specifically to systems, methods, and devices for selectively blocking communications in wireless networks.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The devices may communicate at different data rates. Where many devices share a communication network and there are large differences between the communication rates of the devices network, congestion and inefficient link usage may result. As such, systems, methods, and non-transitory computer-readable media are needed for improving communication efficiency in high efficiency wireless networks.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the size of control frames.

One aspect of the disclosure provides a method of wireless communication. The method comprises transmitting first message for reserving a communication medium utilizing a first transmission characteristic such that the first message is decodable by at least a first subset of a plurality of wireless devices. The method comprises subsequently transmitting a second message for clearing a reservation of the communication medium utilizing a second transmission characteristic such that the second message is decodable by at least a second subset of the plurality of wireless devices and not the first subset of the plurality of wireless devices, thereby clearing access to at least one communication channel for the second subset of the plurality of wireless devices.

Another aspect of the disclosure provides a device for wireless communication. The device comprises a processor configured to generate a first message for reserving a communication medium having a first transmission characteristic such that the first message is decodable by at least a first subset of a plurality of wireless devices, the processor further configured to generate a second message for clearing a reservation of the communication medium having a second transmission characteristic such that the second message is decodable by at least a second subset of the plurality of wireless devices and not the first subset of the plurality of wireless devices. The device comprises a transmitter configured to transmit the first message, the transmitter further configured to subsequently transmit the second message, thereby clearing access to at least one communication channel for the second subset of the plurality of wireless devices.

Another aspect of the disclosure provides a device for wireless communication. The device comprises means for generating a first message for reserving a communication medium having a first transmission characteristic such that the first message is decodable by at least a first subset of a plurality of wireless devices. The device comprises means for generating a second message for clearing a reservation of the communication medium having a second transmission characteristic such that the second message is decodable by at least a second subset of the plurality of wireless devices and not the first subset of the plurality of wireless devices. The device comprises means for transmitting the first message. The device comprises means for subsequently transmitting the second message, thereby clearing access to at least one communication channel for the second subset of the plurality of wireless devices.

Another aspect of the disclosure provides a non-transitory computer-readable medium comprising code that, when executed, causes an apparatus to transmit, utilizing a first transmission characteristic, a first message for reserving a communication medium such that the first message is decodable by at least a first subset of a plurality of wireless devices. The code, when executed further causes the apparatus to subsequently transmit, utilizing a second transmission characteristic, a second message for clearing a reservation of the communication such that the second message is decodable by at least a second subset of the plurality of wireless devices and not the first subset of the plurality of wireless devices, thereby clearing access to at least one communication channel for the second subset of the plurality of wireless devices.

DETAILED DESCRIPTION

Figure 1:
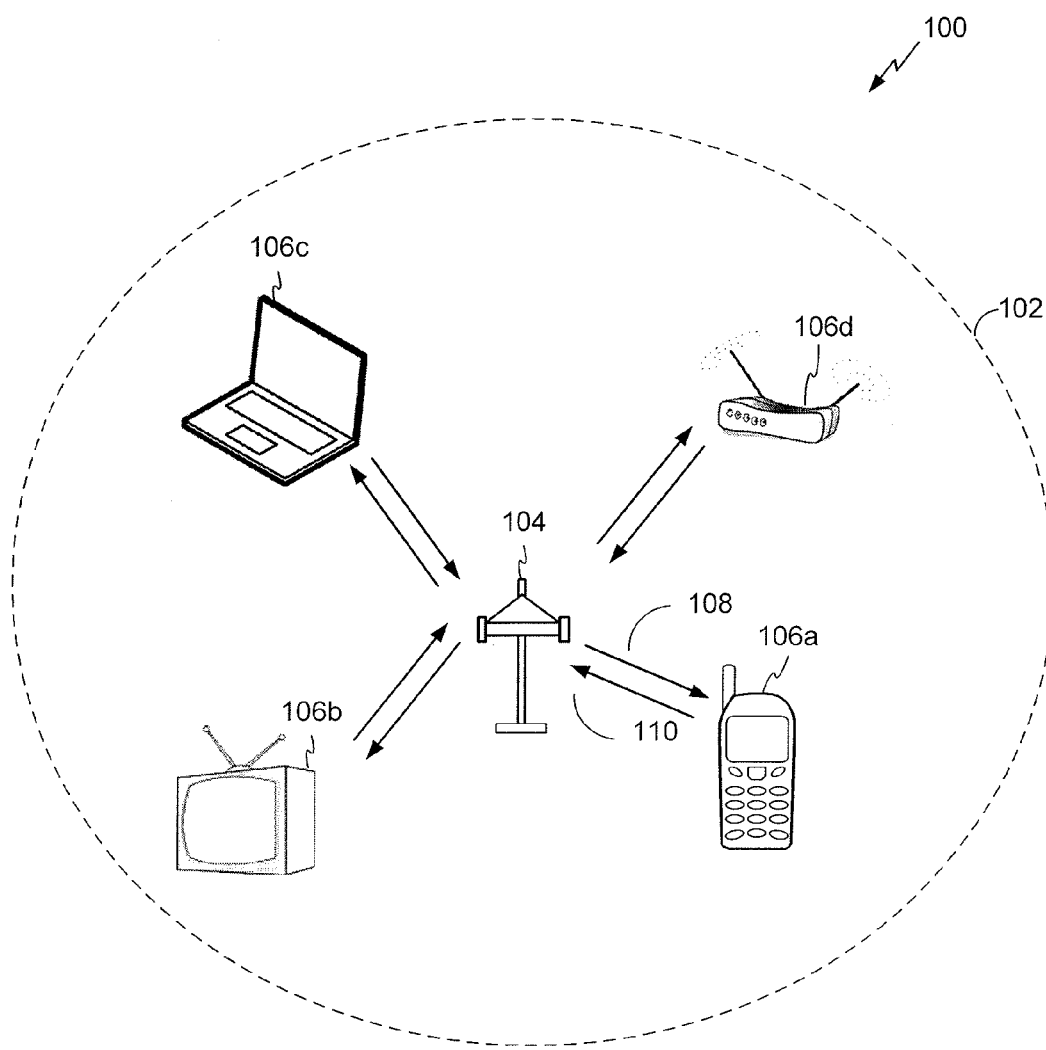
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11 ah, 801.11 ac, 802.11n, 802.11g, and/or 802.11b protocols.

In some aspects, wireless signals in a sub-gigahertz band may be transmitted according to the 802.11 ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, such as 802.11b and/or 802.11g for example, and/or may be used to transmit wireless signals across a relatively long range, for example about one kilometer or longer.

Certain of the devices described herein may further implement Multiple Input Multiple Output (MIMO) technology. This may also be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example at least one of the 802.11ah, 802.11ac, 802.11n, 802.11g and 802.11b standards. The wireless communication system 100 may include an AP 104, which communicates with STAs 106.

A variety of processes and methods may be used for transmissions in the wireless communication system 100 between the AP 104 and the STAs 106. For example, signals may be transmitted and received between the AP 104 and the STAs 106 in accordance with OFDM/OFDMA techniques. If this is the case, the wireless communication system 100 may be referred to as an OFDM/OFDMA system. Alternatively, signals may be transmitted and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
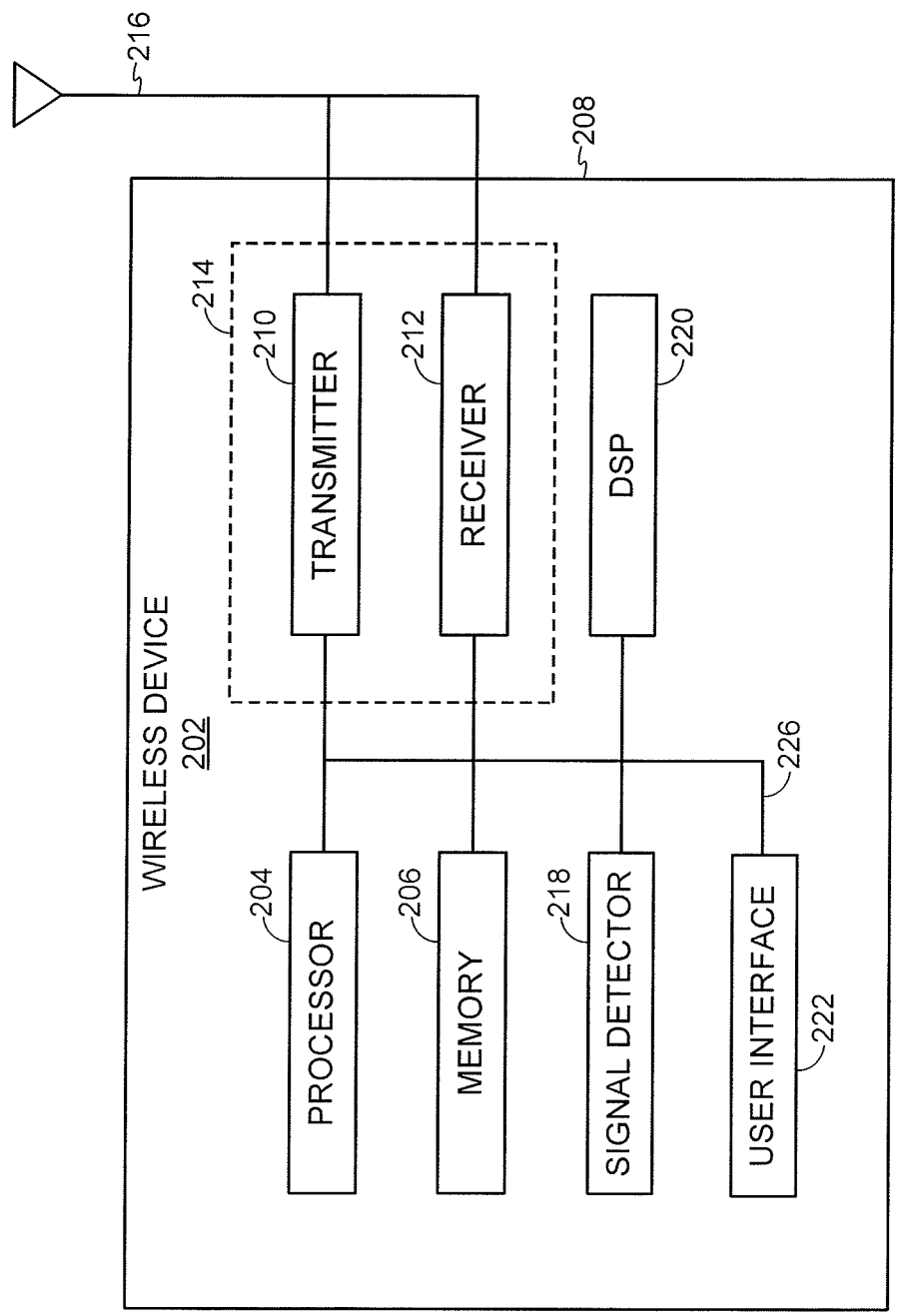
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during MIMO communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106, and may be used to transmit and/or receive communications. The communications exchanged between devices in a wireless network may include data units which may comprise packets or frames. In some aspects, the data units may include data frames, control frames, and/or management frames. Data frames may be used for transmitting data from an AP and/or a STA to other APs and/or STAs.

Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

Figure 3:
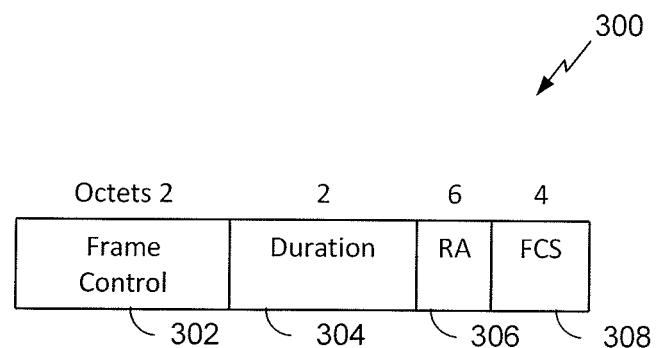
FIG. 3 illustrates an example of a clear to send (CTS)-to-Self frame.

FIG. 3 illustrates an example of a CTS-to-Self frame. The CTS-to-Self frame 300 may be transmitted by a device to reserve a channel or medium for communication. The CTS-to-Self frame 300 includes 4 different fields: a frame control (FC) field 302, a duration field 304, a receiver address (RA) field 306 (also referred to as a receiver address (a1)), and a frame check sequence (FCS) field 308. FIG. 3 further indicates the size in octets of each of the fields 302, 304, 306 and 308 as 2, 2, 6 and 4, respectively. Summing the value of all of the field sizes gives the overall size of the CTS-to-self frame 300, which is 14 octets. The RA field 306 includes a full MAC address of a device, which is a 48-bit (6 octet) value. For a CTS-to-Self frame the MAC address in the RA field 306 would correspond to the device transmitting the CTS-to-Self frame. Since the CTS-to-Self frame 300 is addressed to the same device that transmitted it, all other devices able to decode the CTS-to-Self frame 300 and listening on the communication channel will be silenced for the duration indicated in the duration field 304.

Figure 4:
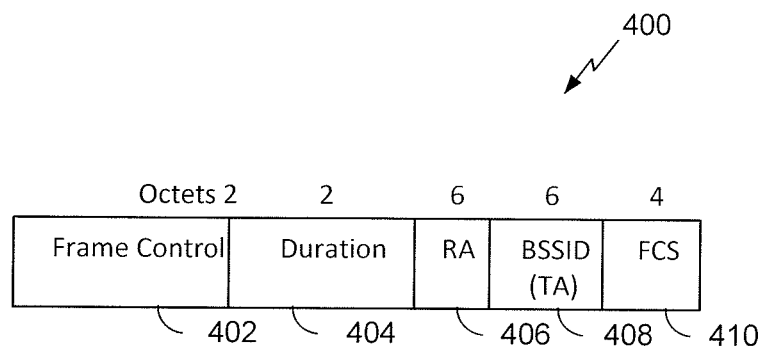
FIG. 4 illustrates an example of a contention free (CF)-end frame.

FIG. 4 illustrates a contention free end (CF-end) frame 400. The CF-end frame 400 may be transmitted by a device signaling the end of a contention free period. Thus, the CF-end frame 400 may be used to cancel a reservation made in response to a network allocation vector (NAV), for example, the CTP-to-Self frame 300 of FIG. 3. Any receiver receiving the CF-end frame 400 may then determine any NAV should be canceled. The CF-end frame 400 includes 5 different fields: a frame control (FC) field 402, a duration field 404, a receiver address (RA) field 406 (also referred to as a receiver address (a1)), a transmitter address (TA) field 408 (also referred to as a transmitter address (a2)), and a frame check sequence (FCS) field 410. FIG. 4 further indicates the size in octets of each of the fields 402, 404, 406, 408 and 410, as 2, 2, 6, 6, and 4, respectively. Summing the value of all of the field sizes gives the overall size of the CF-end frame 400, which is 20 octets. The duration field 404 may be set by the generating STA to 0 to indicate the completion of the transmission opportunity (TXOP) (i.e., set the NAV of the receiving STAs to 0). Each of the RA and TA fields 406, 408 comprises a full MAC address of a device, which is a 48-bit (6 octet) value. Thus, all devices that can decode the CF-end frame 400 listening on the communication channel previously silenced for the duration 304 of the CTS-to-Self frame 300, for example, will be able to communicate on the communication channel again.

Figure 5:
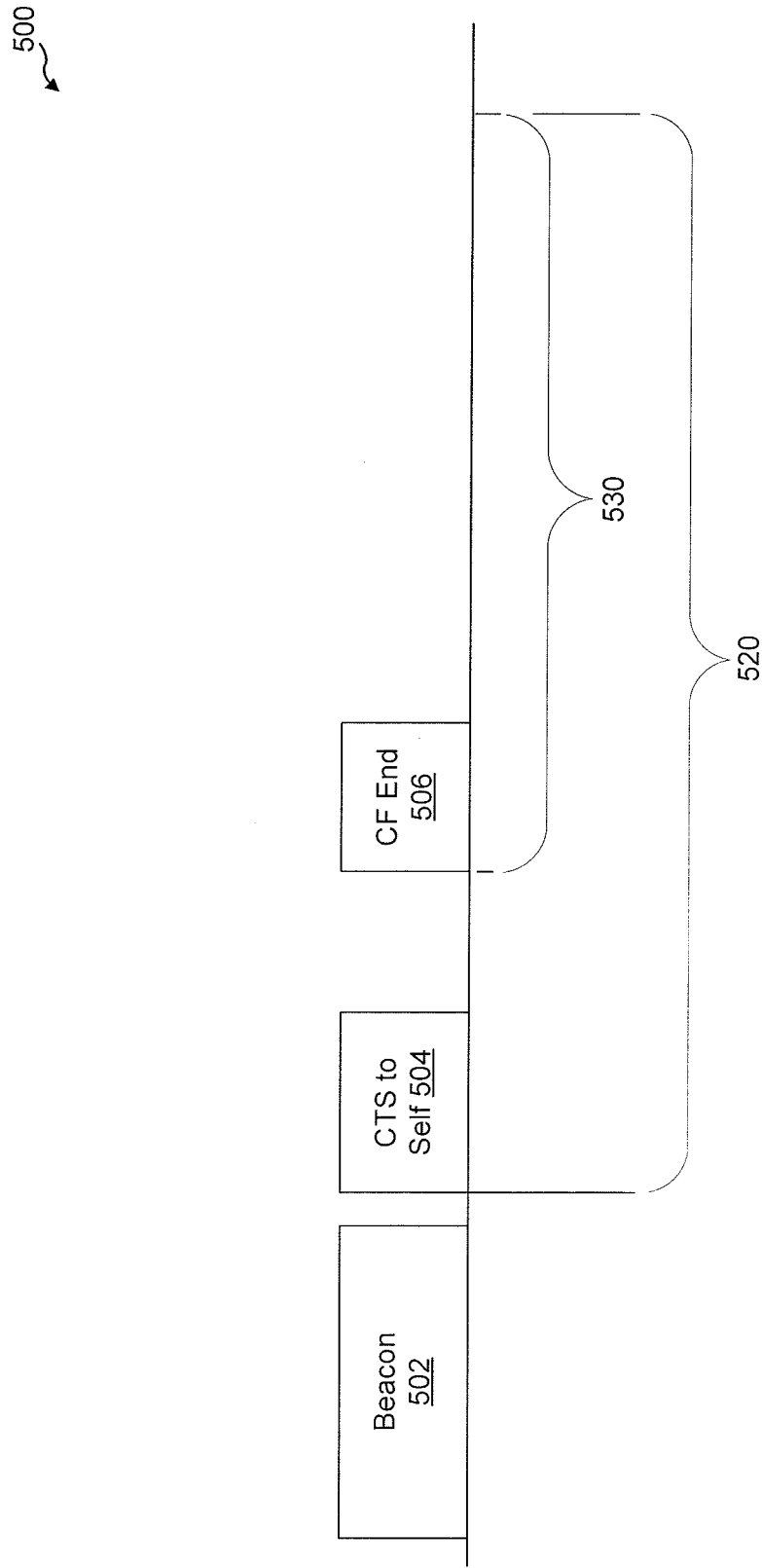
FIG. 5 illustrates a timing diagram including a CTS-to-Self frame and a CF-end frame as may be utilized within the wireless communication system 100.

FIG. 5 illustrates a timing diagram including a CTS-to-Self frame and a CF-end frame as may be utilized within the wireless communication system 100. FIG. 5 shows an exemplary sequence that may be utilized to silence one or more wireless devices while one or more other wireless devices are permitted to communicate. The timing diagram 500 shows beacon 502, CTS-to-Self frame 504 and CF-end frame 506. In FIG. 5, the AP 104 of FIG. 1, for example, may transmit the CTS-to-Self frame 504 to itself. Although the CTS-to-Self frame 504 may be transmitted at any time, transmitting the CTS-to-Self frame 504 near the beacon 502 ensures that the STAs, for example STAs 106a-106d, are awake when the CTS-to-Self frame 504 is transmitted. The CTS-to-Self frame 504 may initiate an interval 520 during which any receiving STAs are silent unless the receiving STAs receive and decode a CF-end frame.

The AP 104 may transmit the CTS-to-Self frame 504 using a transmission characteristic such that at least the wireless devices to be silenced can decode the CTS-to-Self frame 504. For example, with respect to FIG. 1, it may be desirable to silence the STAs 106a, 106b, and 106c so that the STA 106d may communicate with the AP 104 without interference. Thus, the transmission characteristic may be such that at least the STAs 106a, 106b and 106c may decode the CTS-to-Self frame 504. When the STAs 106a-106c detect the CTS-to-Self 504 frame, the STAs 106a-106c will be silenced for the interval 520 as identified by the duration field within the CTS-to-Self frame 504. The duration field of the CTS-to-Self frame 504 may be set such that a predetermined percentage of a total communication time is reserved for the STA 106d to communicate. The STA 106d may also be able to decode the CTS-to-Self frame 504.

The AP 104 may subsequently transmit the CF-end frame 506 using another transmission characteristic such that at least one wireless device to be cleared for communication, and not the at least one wireless devices to be silenced, can decode the CF-end frame 506. The CF-end frame 506 may be transmitted within the duration of the interval 520. For example, the STA 106d may be able to decode the CF-end frame 506. Decoding the CF-end frame 506 will clear any silence command that may have been invoked by the CTS-to-Self frame 504 for the STA 106d. In this way the AP 104 may clear at least one communication channel for the STA 106d. In addition, the AP 104 may repeat transmitting the CTS-to-Self frame 504 and subsequently transmitting the CF-end frame 506 according to a periodic interval.

In one implementation, the transmission characteristic may be a physical layer (PHY) mode. In this implementation, the STAs 106a-106c may include PHYs operating in a mode according to the IEEE 802.11b standard. Thus, the STAs 106a-106c can decode messages transmitted utilizing the PHY mode associated with 802.11ac. By contrast, the STA 106d may have a PHY that operates according to the IEEE 802.11ac standard and, thus, may be able to decode messages transmitted utilizing the PHY mode associated with 802.11ac. In this implementation, the AP 104 may transmit the CTS-to-Self frame 504 utilizing the PHY mode associated with the 802.11b standard, for example. Thus, the STAs 106a-106c can decode the CTS-to-Self frame 504 and will be silent for the interval 520. The AP 104 may subsequently transmit the CF-end frame 506 utilizing the PHY mode associated with the 802.11ac standard. Since the STAs 106a-106c operate utilizing the PHY mode associated with the 802.11b standard the STAs 106a-106c will not be able to decode the CF-end frame 506 and will remain silent for the interval 530. However, the STA 106d will be able to decode the CF-end frame 506 and will be enabled to communicate with the AP 104 without interference from the STAs 106a-106c during the interval 530. In this way, the devices operating in particular PHY modes may be blocked in favor of devices operating in another PHY mode during the interval 530.

In another implementation, the transmission characteristic may be a modulation coding scheme (MCS). In this implementation, the STAs 106a-106c may utilize complementary code keying (CCK), for example, and thus, may be able to decode messages transmitted according the CCK scheme. By contrast, the STA 106d may utilize orthogonal frequency-division multiplexing (OFDM) and, thus, may be able to decode messages transmitted according to the OFDM scheme. In this implementation, the AP 104 may transmit the CTS-to-Self frame 504 utilizing CCK. Thus, the STAs 106a-106c may be able to decode the CTS-to-Self frame 504 and will be silent for the interval 520. The AP 104 may subsequently transmit the CF-end frame 506 utilizing OFDM. Since the STAs 106a-106c operate utilizing the CCK scheme the STAs 106a-106c will not be able to decode the CF-end frame 506 and will remain silent for the interval 530. However, the STA 106d will be able to decode the CF-end frame 506 and will be enabled to communicate without interference from the STAs 106a-106c during the interval 530. In this way, the devices operating under a particular MCS may be blocked in favor of devices operating under another MCS during the interval 530.

In yet another implementation, the transmission characteristic may be a bandwidth. In this implementation, the STAs 106a-106c may communicate utilizing a bandwidth of 20 MHz and, thus, the may be able to decode messages transmitted utilizing the 20 MHz bandwidth. By contrast, the STA 106d may communicate utilizing bandwidths of any of 20 MHz, 40 MHz, 80 MHz and 160 MHz, for example, and thus, may be able to decode messages utilizing bandwidths of any of 20 MHz, 40 MHz, 80 MHz and 160 MHz. In this implementation, the AP 104 may transmit the CTS-to-Self frame 504 utilizing a bandwidth of 20 MHz. Thus, the STAs 106a-106c may be able to decode the CTS-to-Self frame 504 and will be silent for the interval 520. The AP 104 may subsequently transmit the CF-end frame 506 utilizing a bandwidth of 80 MHz. Since the STAs 106a-106c operate utilizing bandwidths of 20 MHz the STAs 106a-106c will not be able to decode the CF-end frame 506 and will remain silent for the interval 530. However, the STA 106d will be able to decode the CF-end frame 506 and will be enabled to communicate without interference from the STAs 106a-106c during the interval 530. In this way, the devices utilizing a particular bandwidth may be blocked in favor of devices utilizing another bandwidth during the interval 530.

In yet another implementation, the transmission characteristic may be a transmission frequency. In this implementation, the STAs 106a-106c may communicate at a frequency of 2.4 GHz and, thus, may be able to decode messages transmitted at 2.4 GHz. By contrast, the STA 106d may communicate and decode messages at a frequency of 5 GHz, for example. In this example, the AP 104 may transmit the CTS-to-Self frame 504 at a frequency of 2.4 GHz. Thus, the STAs 106a-106c may be able to decode the CTS-to-Self frame 504 and will be silent for the interval 520. The AP 104 may subsequently transmit the CF-end frame 506 at a frequency of 5 GHz. Since the STAs 106a-106c operate at a frequency of 2.4 GHz the STAs 106a-106c will not be able to decode the CF-end frame 506 and will remain silent for the interval 530. However, the STA 106d will be able to decode the CF-end frame 506 and will be enabled to communicate without interference from the STAs 106a-106c during the interval 530. In this way, the devices operating at a particular frequency may be blocked in favor of devices operating at another frequency during the interval 530.

In yet another implementation, the transmission characteristic may be a number of MIMO streams. In this implementation, the STAs 106a-106c may communicate and decode messages utilizing only a single data stream. By contrast, the STA 106d may communicate utilizing any number of data streams between 1 and 8, for example and thus, the STA 106d may be able to decode messages transmitted utilizing any number of data streams between 1 and 8. In this example, the AP 104 may transmit the CTS-to-Self frame 504 utilizing a single data stream. Thus, the STAs 106a-106c may be able to decode the CTS-to-Self frame 504 and will be silent for the interval 520. The AP 104 may subsequently transmit the CF-end frame 506 utilizing 4 MIMO data streams, for example. Since the STAs 106a-106c utilize a single data stream the STAs 106a-106c will not be able to decode the CF-end frame 506 and will remain silent for the interval 530. However, the STA 106d will be able to decode the CF-end frame 506 and will be enabled to communicate without interference from the STAs 106a-106c during the interval 530. In this way, the devices only capable of operating in a particular MIMO configuration, or without MIMO, may be blocked in favor of devices capable of operating at another MIMO configuration during the interval 530.

In yet another implementation, the transmission characteristic may be a data rate per stream. In this implementation, the STAs 106a-106c may communicate and decode messages utilizing a data rate of 1, 2, 5.5 or 11 Mb/s. By contrast, the STA 106d may communicate and decode messages at up to more than 800 Mb/s, for example. In this implementation, the AP 104 may transmit the CTS-to-Self frame 504 at a data rate of 11 Mb/s. Thus, the STAs 106a-106c may be able to decode the CTS-to-Self frame 504 and will be silent for the interval 520. The AP 104 may subsequently transmit the CF-end frame 506 at a data rate of 54 Mb/s, for example. Since the STAs 106a-106c may communicate at up to only 11 Mb/s the STAs 106a-106c will not be able to decode the CF-end frame 506 and will remain silent for the interval 530. The CF-end frame 506 transmitted at 54 Mb/s may instead appear as noise to the STAs 106a-106c. However, the STA 106d will be able to decode the CF-end frame 506 and will be enabled to communicate without interference from the STAs 106a-106c during the interval 530. In this way, the devices having low communication rates may be blocked in favor of devices having higher communication rates during the interval 530.

In addition to the exemplary implementations described above, the present application contemplates any combination of the above exemplary implementations without limitation. For example, the AP 104 may transmit the CTS-to-Self frame 504 utilizing an MCS compatible with at least the STAs to be silenced and then transmit the CF-end frame 506 utilizing a number of MIMO channels compatible with the one or more STAs to be cleared for communication and not the STAs to be silenced.

The present inventive concepts need not be limited to a single group of devices to be silenced and a single group of devices to be cleared for communication. In another implementation, a sequence of CF-end frames may be transmitted having successively different transmission characteristics in order to allow successive access to a communication channel based on STA compatibility with the successively different transmission characteristics. In this way, finer grained control of what devices are blocked, and during which intervals, may be affected.

Figure 6:
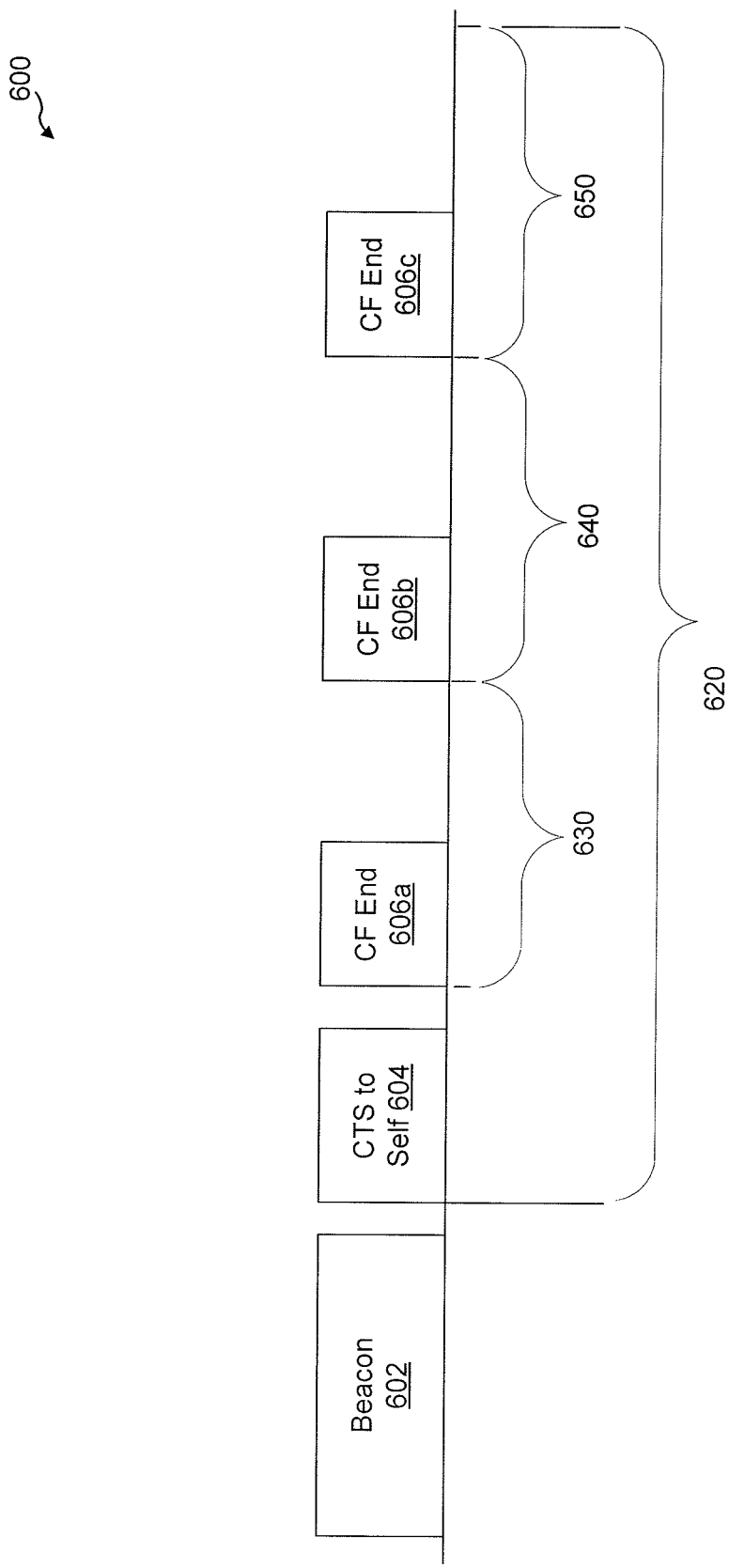
FIG. 6 illustrates another timing diagram including a CTS-to-Self frame and a sequence of CF-end frames as may be utilized within the wireless communication system 100.

FIG. 6 illustrates another timing diagram including a CTS-to-Self frame and a sequence of CF-end frames as may be utilized within the wireless communication system 100. FIG. 6 shows an exemplary sequence that may be utilized to silence one or more wireless devices while a plurality of other wireless devices are permitted to communicate during successive intervals based on their compatibility with one or more transmission characteristics. The timing diagram 600 shows beacon 602, CTS-to-Self frame 604, CF-end frame 606a, CF-end frame 606b, and CF-end frame 606c. Although three CF-end frames are shown, the present application is not so limited and may include any number of CF-end frames. In FIG. 6, an AP, for example the AP 104 of FIG. 1, may transmit the CTS-to-Self frame 604 to itself. Although the CTS-to-Self frame 604 may be transmitted at any time, transmitting the CTS-to-Self frame 604 near the beacon 602 ensures that the STAs, for example STAs 106a-106d, are awake when the CTS-to-Self frame 604 is transmitted. The CTS-to-Self frame 604 may initiate an interval 620 during which any receiving STAs are silent.

The AP 104 may transmit the CTS-to-Self frame 604 using a transmission characteristic such that at least the wireless devices to be silenced may decode the CTS-to-Self frame 604. For example, with respect to FIG. 1, it may be desirable to silence the STAs 106a, 106b, and 106c for at least a certain interval so that the STA 106d may communicate with the AP 104 without interference. The AP 2104 may transmit the CTS-to-Self frame 604 using a transmission characteristic that the STAs 106a, 106b and 106c can decode. Thus, the STAs 106a-106c will be silent for the interval 620 as identified by the duration field within the CTS-to-Self frame 604. The STA 106d may also be able to decode the CTS-to-Self frame 604.

In one implementation, the STA 106a of FIG. 1 may only be capable of communicating utilizing a single data stream. The STA 106b may be capable of communicating utilizing either a single data stream or 2 MIMO data streams. The STA 106c may be capable of communicating utilizing any number of data streams between 1 and 3. The STA 106d may be capable of communicating utilizing any number of data streams from 1 to 4. Thus, in this implementation, the AP 104 may transmit the CTS-to-Self frame 604 utilizing a single data stream such that each of the STAs 106a-106d may decode the CTS-to-Self frame 604 and be silent.

The AP 104 may subsequently transmit the CF-end frame 606a utilizing 4 MIMO data streams. Thus, the STA 106d will be able to decode the CF-end frame 606a and will be cleared to communicate over the communication channel in exclusivity for at least the interval 630. Since the STAs 106a-106c cannot decode messages transmitted utilizing 4 MIMO data streams, the STAs 106a-106c cannot decode the CF-end frame 606a and will remain silent.

The AP 104 may subsequently transmit the CF-end frame 606b utilizing 3 MIMO data streams. Thus, both the STAs 106c and 106d will be able to decode the CF-end frame 606b. The STA 106d has already been cleared for communication by the CF-end frame 606a. The STA 106c will now be cleared to communicate over the communication channel along with the STA 106d for at least the interval 640. Since the STAs 106a-106b cannot decode messages transmitted utilizing 3 MIMO data streams, the STAs 106a-106b cannot decode the CF-end frame 606b and will remain silent.

The AP 104 may subsequently transmit the CF-end frame 606c utilizing 2 MIMO data streams. Thus, each of the STAs 106b-106d will be able to decode the CF-end frame 606c. The STAs 106c and 106d have already been cleared for communication by the CF-end frames 606b and 606a, respectively. The STA 106b will now be cleared to communicate over the communication channel along with the STAs 106c and 106d for at least the interval 650, while the STA 106a will remain silent.

Although the above implementation utilizes the number of MIMO data channels as the transmission characteristic, the present application is not so limited. Other implementations may utilize transmission characteristics including but not limited to, the PHY mode, the MCS, the bandwidth, the transmission frequency, the data rate, or any combination of those transmission characteristics, similar to that previously described in connection with FIG. 5. In addition, the AP 104 may repeat transmitting the CTS-to-Self frame 604 and subsequently transmitting the sequence of CF-end frames 606a-606c according to a periodic interval. Although the examples described above in connection with FIGS. 5 and 6 utilize CTS-to-Self frames and CF-end frames, these frame types are only exemplary and the present application is not so limited. For example, any frame or message that serves to reserve one or more channels or a medium for communication may be utilized in place of the CTS-to-Self frames. Likewise, any frame or message that serves to clear such a reservation of one or more channels or a medium may be utilized in place of the CF-end frames.

Figure 7:
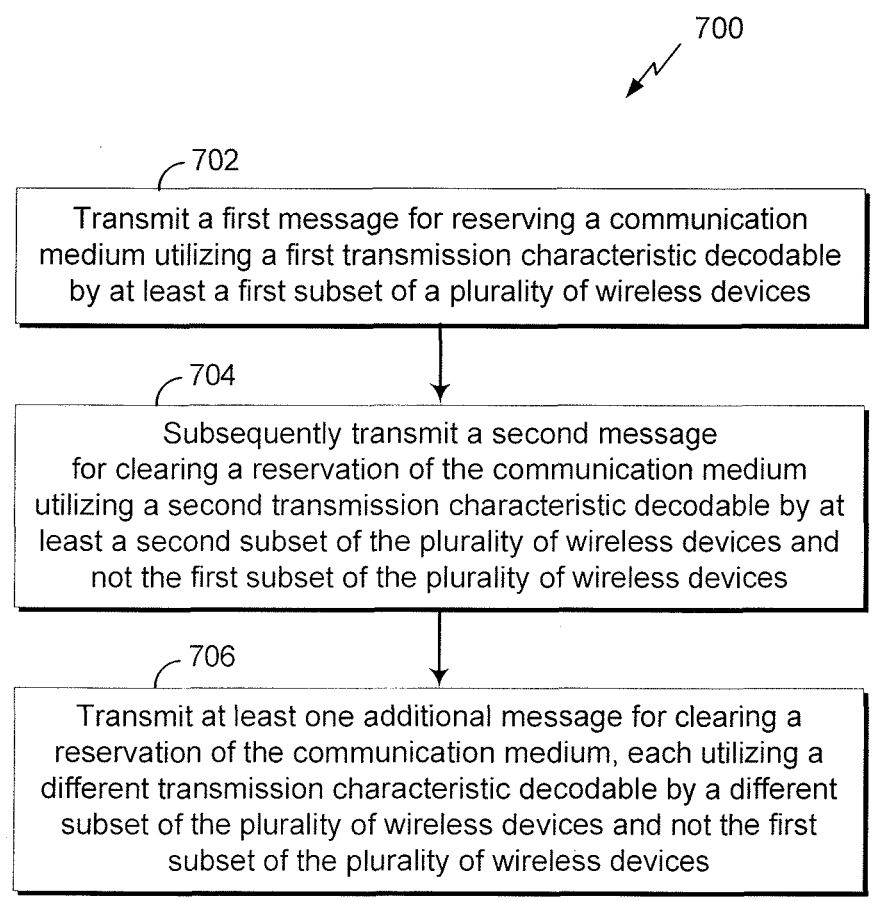
FIG. 7 shows a flow chart of an exemplary method of wireless communication.

FIG. 7 shows a flowchart of an aspect of an exemplary method of wireless communication. The method 700 may be used to generate and transmit any of the frames described above. The method of flowchart 700 is described herein with reference to the timing diagrams 500 and 600, as previously described in connection with FIGS. 5 and 6. The frames may be transmitted by the AP 104 to one or more of the STAs 106a-106d shown in FIG. 1. In addition, the wireless device 202 shown in FIG. 2 may represent a more detailed view of the AP 104, as described above. Thus, in one implementation, one or more of the steps in flowchart 700 may be performed by, or in connection with, a processor and/or transmitter, such as the processor 204 and transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

First, at block 702, the AP 104 may transmit a first message for reserving a communication medium utilizing a first transmission characteristic such that the first message is decodable by at least a first subset of a plurality of wireless devices. For example, the AP 104 may transmit the CTS-to-Self frame 504 using a transmission characteristic such that at least the STAs 106a, 106b and 106c may decode the CTS-to-Self frame 504. In such an example, at least the STAs 106a-106c will be silenced for the interval 520.

Then, at a block 704, the AP 104 subsequently transmits a second message for clearing a reservation of the communication medium utilizing a second transmission characteristic such that the second message is decodable by at least a second subset of the plurality of wireless devices and not the first subset of the plurality of wireless devices. This clears access to at least one communication channel for the second subset of the plurality of wireless devices. For example, the AP 104 may transmit the CF-end frame 506 using a transmission characteristic such that the STA 106d may decode the CF-end frame 506. This will clear any silence command within the STA 106d that may have been invoked by the CTS-to-Self frame 504.

Where more than one message for clearing a reservation of the communication medium (e.g, a CF-end frame) is transmitted, the method 700 may continue with block 706. At block 706, the AP 104 transmits at least one additional message for clearing a reservation of the communication medium, each utilizing a different transmission characteristic decodable by a different subset of the plurality of wireless devices and not the first subset of the plurality of wireless devices. For example, a sequence of CF-end frames may be transmitted having successively different transmission characteristics in order to allow successive access to a communication channel based on STA compatibility with the successively different transmission characteristics. As previously described in connection with FIG. 6, the AP 104 may transmit the CF-end frame 606b utilizing a transmission characteristic that the STA 106c can decode. The STA 106c will now be cleared to communicate over the communication channel along with the STA 106d for at least the interval 640, while the STAs 106a-106b remain silent. The AP 104 may subsequently transmit the CF-end frame 606c utilizing a still different transmission characteristic that the STA 106*b* can decode. The STA 106*b* will now be cleared to communicate over the communication channel along with the STAs 106*c* and 106*d* for at least the interval 650, while the STA 106*a* remains silent.

The above implementations are compatible with legacy 802.11 wireless STAs and do not require any PHY or MAC changes. Moreover, a wireless device instituting one or more methods herein disclosed do not require an awareness of the number or capabilities of the surrounding STAs, as the transmission characteristics of the frames transmitted determine whether a particular STA will be blocked from communicating during a particular interval.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
    transmitting a first message for reserving a communication medium utilizing a first transmission characteristic such that the first message is decodable by at least a first subset of a plurality of wireless devices; and
    subsequently transmitting a second message for clearing a reservation of the communication medium utilizing a second transmission characteristic such that the second message is decodable by at least a second subset of the plurality of wireless devices and not the first subset of the plurality of wireless devices, thereby clearing access to at least one communication channel for the second subset of the plurality of wireless devices.

2. The method of claim 1, further comprising transmitting at least one additional message for clearing a reservation of the communication medium, each utilizing a different transmission characteristic, such that each of the at least one additional message for clearing a reservation of the communication medium is decodable by a different subset of the plurality of wireless devices and not the first subset of the plurality of wireless devices, thereby sequentially clearing access to the at least one communication channel for each of the different subsets of the plurality of wireless devices, wherein each of the different subsets of the plurality of wireless devices are able to decode the first message.

3. The method of claim 1, wherein the first message has a duration and the second message is transmitted within the duration.

4. The method of claim 1, further comprising setting the duration such that a predetermined percentage of a total communication time over the at least one communication channel is reserved for the second subset of the plurality of wireless devices.

5. The method of claim 1, further comprising repeating the transmitting the first message and the subsequently transmitting the second message according to a periodic interval.

6. The method of claim 1, wherein the first transmission characteristic comprises at least one of a first transmission frequency, a first physical layer mode, a first modulation coding scheme, a first number of concurrent data streams, and a first data rate.

7. The method of claim 1, wherein the second transmission characteristic is at least one of a second physical layer mode, a second modulation coding scheme, a second number of concurrent data streams, and a second data rate.

8. The method of claim 1, wherein the first message comprises a clear to send message.

9. The method of claim 1, wherein the second message comprises a contention free end message.

10. The method of claim 2, wherein the at least one additional message for clearing a reservation of the communication medium comprises a contention free end message.

11. The method of claim 1, wherein the first subset of the plurality of wireless device are not mutually exclusive from the second subset of the plurality of wireless devices.

12. A device for wireless communication, comprising:
    a processor configured to generate a first message for reserving a communication medium having a first transmission characteristic such that the first message is decodable by at least a first subset of a plurality of wireless devices, the processor further configured to generate a second message for clearing a reservation of the communication medium having a second transmission characteristic such that the second message is decodable by at least a second subset of the plurality of wireless devices and not the first subset of the plurality of wireless devices; and
    a transmitter configured to transmit the first message, the transmitter further configured to subsequently transmit the second message, thereby clearing access to at least one communication channel for the second subset of the plurality of wireless devices.

13. The device of claim 12, wherein:
    the processor is further configured to generate at least one additional message for clearing a reservation of the communication medium, each utilizing a different transmission characteristic, such that each of the at least one additional message for clearing a reservation of the communication medium is decodable by a different subset of the plurality of wireless devices and not the first subset of the plurality of wireless devices; and
    the transmitter is further configured to transmit the at least one additional message for clearing a reservation of the communication medium, thereby sequentially clearing access to the at least one communication channel for each of the different subsets of the plurality of wireless devices, wherein each of the different subsets of the plurality of wireless devices are able to decode the first message.

14. The device of claim 12, wherein the first message has a duration and the transmitter is further configured to transmit the second message within the duration.

15. The device of claim 14, wherein the processor is further configured to set the duration such that a predetermined percentage of a total communication time over the at least one communication channel is reserved for the second subset of the plurality of wireless devices.

16. The device of claim 12, wherein the transmitter is further configured to repeat the transmitting the first message and the subsequently transmitting the second message according to a periodic interval.

17. The device of claim 12, wherein the first transmission characteristic comprises at least one of a first transmission frequency, a first physical layer mode, a first modulation coding scheme, a first number of concurrent data streams, and a first data rate.

18. The device of claim 12, wherein the second transmission characteristic comprises at least one of a second physical layer mode, a second modulation coding scheme, a second number of concurrent data streams, and a second data rate.

19. The device of claim 12, wherein the first message comprises a clear to send message.

20. The device of claim 12, wherein the second message comprises a contention free end message.

21. The device of claim 13, wherein the at least one additional message for clearing a reservation of the communication medium comprises a contention free end message.

22. The device of claim 12, wherein the first subset of the plurality of wireless device are not mutually exclusive from the second subset of the plurality of wireless devices.

23. A device for wireless communication, comprising:
means for generating a first message for reserving a communication medium having a first transmission characteristic such that the first message is decodable by at least a first subset of a plurality of wireless devices;
means for generating a second message for clearing a reservation of the communication medium having a second transmission characteristic such that the second message is decodable by at least a second subset of the plurality of wireless devices and not the first subset of the plurality of wireless devices;
means for transmitting the first message; and
means for subsequently transmitting the second message, thereby clearing access to at least one communication channel for the second subset of the plurality of wireless devices.

24. The device of claim 23, comprising:
means for generating at least one additional message for clearing a reservation of the communication medium, each utilizing a different transmission characteristic, such that each of the at least one additional message is decodable by a different subset of the plurality of wireless devices and not the first subset of the plurality of wireless devices; and
means for transmitting the at least one additional message for clearing a reservation of the communication medium, thereby sequentially clearing access to the at least one communication channel for each of the different subsets of the plurality of wireless devices, wherein each of the different subsets of the plurality of wireless devices are able to decode the first message.

25. The device of claim 23, wherein the first message has a duration and the second message is transmitted within the duration.

26. The device of claim 25, wherein the means for generating the first message sets the duration such that a predetermined percentage of a total communication time over the at least one communication channel is reserved for the second subset of the plurality of wireless devices.

27. The device of claim 23, wherein the transmitting the first message and the subsequently transmitting the second message is repeated according to a periodic interval.

28. The device of claim 23, wherein the first transmission characteristic comprises at least one of a first transmission frequency, a first physical layer mode, a first modulation coding scheme, a first number of concurrent data streams, and a first data rate.

29. The device of claim 23, wherein the second transmission characteristic comprises at least one of a second physical layer mode, a second modulation coding scheme, a second number of concurrent data streams, and a second data rate.

30. The device of claim 23, wherein the first message comprises a clear to send message.

31. The device of claim 23, wherein the second message comprises a contention free end message.

32. The device of claim 24, wherein the at least one additional message for clearing a reservation of the communication medium comprises a contention free end message.

33. The device of claim 23, wherein the first subset of the plurality of wireless device are not mutually exclusive from the second subset of the plurality of wireless devices.

34. A non-transitory computer-readable medium comprising code that, when executed, causes an apparatus to:
transmit, utilizing a first transmission characteristic, a first message for reserving a communication medium such that the first message is decodable by at least a first subset of a plurality of wireless devices; and
subsequently transmit, utilizing a second transmission characteristic, a second message for clearing a reservation of the communication medium such that the second message is decodable by at least a second subset of the plurality of wireless devices and not the first subset of the plurality of wireless devices, thereby clearing access to at least one communication channel for the second subset of the plurality of wireless devices.

35. The non-transitory computer-readable medium of claim 34, further comprising code that, when executed, causes the apparatus to transmit at least one additional message for clearing a reservation of the communication medium, each utilizing a different transmission characteristic, such that each of the at least one additional message for clearing a reservation of the communication medium is decodable by a different subset of the plurality of wireless devices and not the first subset of the plurality of wireless devices, thereby sequentially clearing access to the at least one communication channel for each of the different subsets of the plurality of wireless devices, wherein each of the different subsets of the plurality of wireless devices are able to decode the first message.

36. The non-transitory computer-readable medium of claim 34, wherein the first message has a duration and the second message is transmitted during the duration.

37. The non-transitory computer-readable medium of claim 35, further comprising code that, when executed, causes the apparatus to set the duration such that a predetermined percentage of a total communication time over the at least one communication channel is reserved for the second subset of the plurality of wireless devices.

38. The non-transitory computer-readable medium of claim 34, further comprising code that, when executed, causes the apparatus to repeat the transmitting the first message and the subsequently transmitting the second message according to a periodic interval.

39. The non-transitory computer-readable medium of claim 34, wherein the first transmission characteristic comprises at least one of a first transmission frequency, a first physical layer mode, a first modulation coding scheme, a first number of concurrent data streams, and a first data rate.

40. The non-transitory computer-readable medium of claim 34, wherein the second transmission characteristic comprises at least one of a second physical layer mode, a second modulation coding scheme, a second number of concurrent data streams, and a second data rate.

41. The non-transitory computer-readable medium of claim 34, wherein the first message comprises a clear to send message.

42. The non-transitory computer-readable medium of claim 34, wherein the second message comprises a contention free end message.

43. The non-transitory computer-readable medium of claim 35, wherein the at least one additional message for clearing a reservation of the communication medium comprises a contention free end message.

44. The method of claim 34, wherein the first subset of the plurality of wireless device are not mutually exclusive from the second subset of the plurality of wireless devices.

* * * * *